June 4, 1963  J. I. NEVO-HACOHEN  3,092,488
METHOD FOR PRODUCING PHOSPHATE FERTILIZERS
Original Filed April 28, 1960
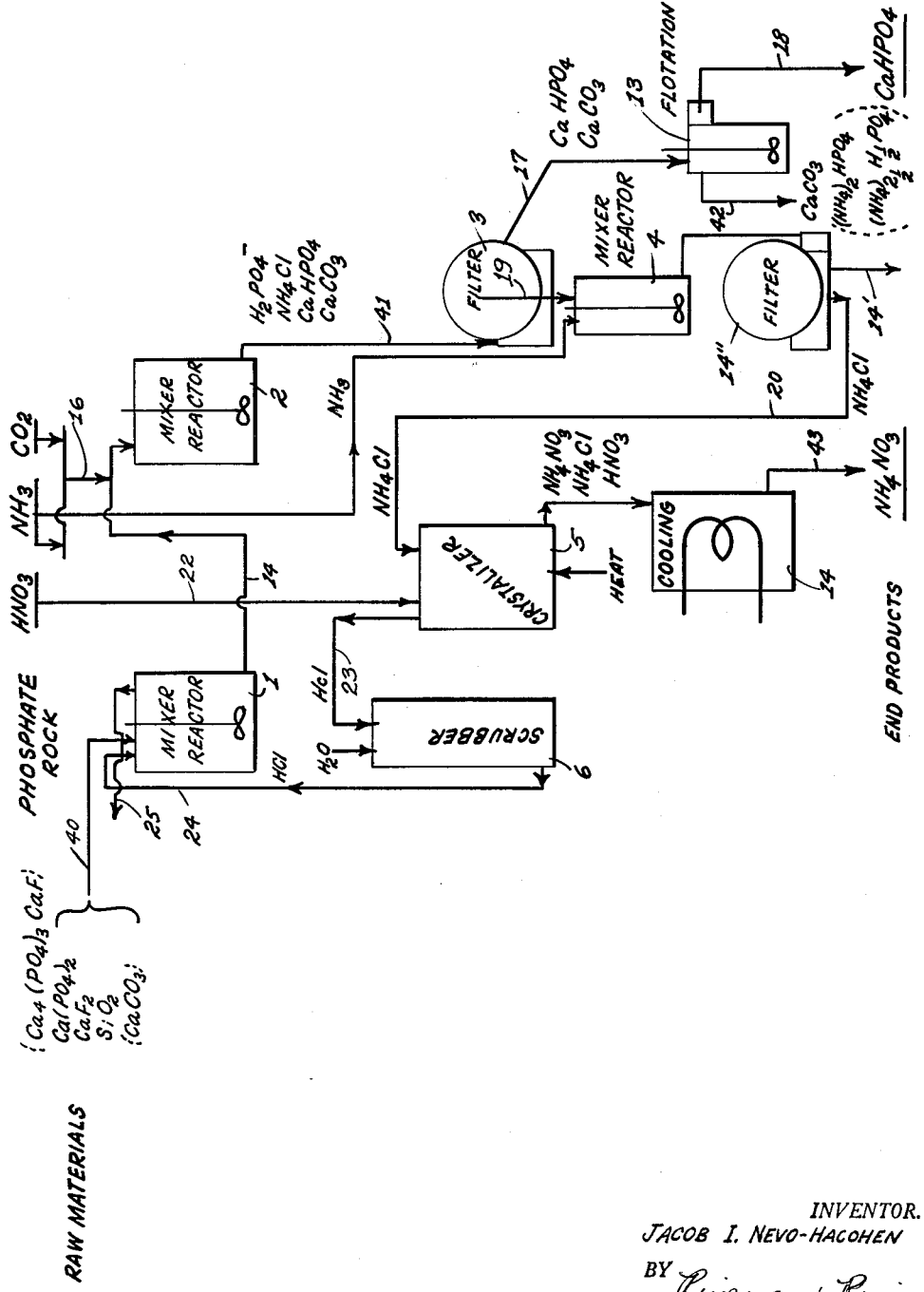
INVENTOR.
JACOB I. NEVO-HACOHEN
BY Rines and Rines
ATTORNEYS 3,092,488
Patented June 4, 1963

3,092,488
METHOD FOR PRODUCING PHOSPHATE FERTILIZERS

Jacob I. Nevo-Hacohen, Allston, Mass., assignor of one-third to Robert H. Rines, Boston, Mass.
Continuation of application Ser. No. 25,384, Apr. 28, 1960. This application June 13, 1960, Ser. No. 35,754
3 Claims. (Cl. 71—39)

The present invention relates primarily to the manufacture of compositions that assist plant growth, and, more particularly, to processes for the manufacture of fertilizers containing nitrogen, potassium or the like, and phosphate compounds, and various useful by-products. This application is a continuation of my copending application, Serial No. 25,384, filed on or about April 28, 1960, for Process for the Manufacture of Fertilizers and the Like.

As explained in my copending application, numerous processes for the manufacture of fertilizers have been evolved and employed throughout the years. As an illustration, phosphate rock has been treated with sulphuric acid to produce calcium monophosphate, either in a single stage, or in a multi-stage process involving the production of concentrated phosphoric acid and the utilization thereof to treat further amounts of the rock, ultimately to produce the calcium mono-phosphate (then known as "triple superphosphate," in view of the increased yield). Unfortunately, in the said single-stage process, a large amount of calcium sulphate is combined with the superphosphate, and, though useless to the fertilizing properties of the mixture, and decidedly disadvantageous as weight and bulk surplusage, the calcium compound inherently must be present in the end-product fertilizer. In the multi-stage process, also, the useless and disadvantageous calcium sulphate precipitates out and proves difficult to remove in view of the large quantities inherently produced. Many suggestions have been offered, accordingly, for trying to find some useful purpose for the inherently present calcium sulphate, such as, for example, treating it with ammonia and carbon dioxide to produce an ammonium sulphate salt which can be beneficially used in the fertilizer. Even so, a large quantity of calcium carbonate then deposits out, which again represents useless contaminant and undesired bulk and weight.

Other processes that have been evolved to try to solve the problem of unnecessary and undesired by-products in the fertilizer have involved treating the phosphate rock in a high-temperature blast or electric furnace in the presence of carbon, thereby to produce vaporous phosphorous that may then be formed into phosphoric acid. In this manner, phosphorous is made available from the rock for use in fertilizers, baking powders, cleansers, and for other uses. This dry process, however, is quite expensive to conduct, and, in consequence, it cannot therefore generally be used for the production of commercial fertilizers, except, perhaps, for home use in small gardens and the like, where cost is not a primary factor.

Other proposals advanced by the fertilizer manufacturing industry have involved treating the phosphate rock with nitric acid; but such a process is very rarely used because of the very high cost of nitric acid, as compared with the cost of the before-mentioned sulphuric acid. The nitric-acid-treated rock may be combined with ammonia, as in a slurry, to produce a soluble phosphatic product that may then be treated with carbon dioxide to produce ammonium nitrate, precipitating calcium carbonate. The resulting product, however, not only lacks the potassium required for plant growth and for the strength of the plant, but it involves the inherent and undesirable presence of large quantities of calcium by-product in the fertilizer.

In an effort to try to solve this long-pressing commercial problem, it has also been proposed to treat the phosphate rock with hydro-chloric acid. In addition to the expense involved in furnishing a continuous external supply of hydrochloric acid, as compared with the previously described sulphuric acid, this process results in the production of appreciable quantities of calcium chloride—a poison to many plants if the chlorine content is over two thousand parts per million. The presence of calcium chloride, furthermore, disadvantageously renders the fertilizer very hygroscopic. Again, moreover, the resulting fertilizer product is inherently loaded with useless calcium compound.

Numerous other processes have also been proposed, but they have all been subject to the same kind of difficulties above discussed. Beneficial plant-growth additives, such as potassium chloride or potassium sulphate are employed in order to derive potassium content for the ultimate fertilizer; but in the prior-art commercial processes, the percentage of nitrogen compound, phosphorous compound and potassium compound have generally been limited to the order of 25 to 29% of the total fertilizer product because of the inherent presence of the above-mentioned undesired, though heretofore unavoidable, calcium and other by-products. Thus, for example, in a present-day fertilizer mixture, there may be about 10% nitrogen content, about 6% $P_2O_5$ content, and about 4% $K_2O$, for a total of only about 20% active fertilizer constituent; the remaining 80% of the fertilizer consisting of carrier or soil-conditioning materials, including the unnecessary and undesired, but heretofore unremovable calcium, and, often, the very much undesired chloride. This important commercial problem of unnecessary and undesired weight, expense and bulk, is of prime importance in the shipping and utilization of fertilizers; and yet, until the present invention, it has remained largely without satisfactory solution, as above-explained, despite the many and varied proposals advanced by experts in this field for at least the past generation.

In the said copending application, a most satisfactory process is disclosed for obviating these difficulties and poor yields, comprising reacting the phosphate rock with hydrochloric acid to produce calcium mono-phosphate and by-products; adding preferably potassium chloride, ammonia and carbon dioxide to the calcium monophosphate product to produce potassium monophosphate, ammonium chloride and calcium carbonate; maintaining the pH during this reaction sufficiently large, preferably between substantially 6 and 7, to insure the maintenance of the phosphate, in large proportion, in the soluble state and the precipitation of the said calcium carbonate; and heat-separating the ammonium chloride in gaseous form to separate out either potassium monophosphate at one predetermined temperature or potassium metaphosphate at a higher temperature. The gaseous ammonium chloride may be reacted with nitric acid and cooled to produce the ammonium nitrate fertilizer component. In the last step, gaseous hydrochloric acid also results which may be scrubbed and fed-back to the phosphate rock to sustain the process cycle.

While the above-mentioned heat-separating step for separating the ammonium chloride is most satisfactory, there are occasions where improved fertilizer products and the like can be produced (particularly for highly acid soils), and in larger yields, by an improved process.

An object of the present invention, accordingly, is to provide a new and improved process for the production or manufacture of fertilizers and the like that shall not be subject to any of the above-mentioned disadvantages; but that, to the contrary, shall provide for extremely large percentages of nitrogen, phosphorous compound and potassium compound in fertilizers, as desired, far in excess of those presently available by the techniques above-described and the other prior-art processes of this industry, and even in excess, if desired, of those obtainable in accordance with the invention of my said copending application.

A further object is to provide a new and improved process for producing nitrogen-bearing compounds and/or later-described by-products of more general utility, also.

Other and further objects will be explained hereinafter and will be more particularly pointed out in the appended claims.

The invention will now be described in connection with the accompanying drawing which depicts a flow-sheet illustrating the invention in preferred form. In summary, one of the primary features of the invention resides in the process of manufacturing a fertilizer component and the like that comprises reacting the phosphate rock with hydrochloric acid to produce calcium monophosphate and by-products; adding preferably ammonia and carbon dioxide to the calcium monophosphate product to produce ammonium monophosphate, ammonium chloride and calcium carbonate; maintaining the pH during this reaction sufficiently large, preferably between substantially 6 and 7, to insure the maintenance of the phosphate, in large proportion, in the soluble state and the precipitation of the said calcium carbonate; filtering off the calcium carbonate and treating the filtrate with additional ammonia; elevating the pH above the before-mentioned pH during the treating with additional ammonia, and precipitating out an ammonium phosphate salt from a resulting ammonium chloride solution. The ammonium chloride may be reacted with nitric acid and cooled to produce an ammonium nitrate fertilizer component; and, in the last step, gaseous hydrochloric acid also results which may be scrubbed and fedback to the phosphate rock to sustain the process cycle.

In the present process, the first step, as in the said copending application, involves reacting on the phosphate rock with hydrochloric acid. Hydrochloric acid is originally supplied in the mixer reactor 1, though, as the process progresses, hydrochloric acid may be manufactured as a by-product that is fedback along later-discussed path 24 to assist in continuing or sustaining the process. Into the mixer 1 is placed the phosphate rock, as indicated by the arrowed path 40, so that a reaction takes place with the hydrochloric acid, producing, principally, calcium monophosphate $Ca(H_2PO_4)_2$ and calcium chloride $CaCl_2$ at the output path 14. As gaseous by-products, HF is removed along path 25. The resulting calcium mono-phosphate and calcium chloride (and water) is passed out of the mixer reactor 1 along the path 14 to a second mixer reactor 2. Prior to entry into the mixer 2, these reaction products may be supplemented by the addition of ammonia and carbon dioxide, preferably gaseous, as shown at 16.

In actual practice, some $CaHPO_4$ may be formed. At low values of pH, phosphoric acid predominates; and at a pH of about 5, there is substantial $(HPO_4)$ and ionic $(H_2PO_4)$. It has been found that with a pH in excess of 5, of between substantially 6 and 7, and preferably about 6.5, there will be produced a principal proportion of soluble $(H_2PO_4)$—namely, about 98%—and only about 2% $(HPO_4)$ that is almost insoluble. As explained in my said copending application, the relative amounts of added $NH_3$ and $CO_2$ at the input 16 are controlled to insure a pH of the above-described value in order to maintain the resulting phosphate in large proportion in the desired soluble state, and to tend to precipitate the undesired $CaCO_3$, though the action of the mixer 2 prevents an actual deposit thereof.

The output of the mixer 2 will thus contain monophosphate, calcium carbonate, ammonium chloride, and probably a small quantity of calcium di-phosphate. These products are passed along path 41 to a filter 3. The separated cake calcium carbonate and whatever calcium di-phosphate may be present are then carried along the path 17 to flotation cells 13 in order therein to rescue the small quantity of calcium di-phosphate at 18, with the bulk of the calcium carbonate waste precipitating out at 42. The calcium di-phosphate is a very valuable product, being useful as animal food or for related purposes.

The filtrate at 3 containing the monophosphate and the ammonium chloride is then, in accordance with the present invention, fed at 19 to a further mixer reactor 4 to which further ammonia (or ammonium hydroxide or the like, also termed "ammonia") is added to a degree such as appreciably to raise the pH, preferably to between 8 and 9. Under such conditions, an ammonium chloride solution will pass through filter 14" along path 20 to a heated crystallizer chamber 5 into which chamber dilute nitric acid is introduced along the path 22. As a result of the heating, hydrochloric acid is driven off at 23. Since the liquor here-involved is a mixture of nitric acid and hydrochloric acid, which can attack most materials, the materials of the chamber 5 will have to be selected from those plastic or other materials that are known to resist this acid combination. By cooling in the fractional crystallization chamber 14, ammonium nitrate is produced at 43—an uncontaminated fertilizer component. The ammonium nitrate crystals may also be recovered by centrifuging or other well-known processes, as described, for example, on page 386 of "Selected Process Industries," McGraw-Hill, 1950, by R. N. Schreve.

The hydrochloric acid in the path 23 is fed to a scrubber 6, into which water is injected, in accordance with the "carbite" process. Hydrochloric acid is thus produced for cycling or feeding back along path 24 into the original mixer reactor 1, thereby sustaining reaction with the phosphate rock in connection with this process.

By adding at the output 14 of the reactor 1 only ammonia and carbon dioxide, and adding further ammonia at the input to reactor 4, as above explained, ammonium di-phosphate ($[NH_4]_2HPO_4$) and/or $(NH_4)_{2\ 1/2}H_{1/2}PO_4$, will then precipitate out at 14', devoid of potassium salts. These compounds are particularly desirable fertilizer components for acid soils.

In summary, therefore, in accordance with a basic feature of the invention in the manufacture of fertilizer and the like, the principal advantages reside in the elimination, when desired, of chlorine with its harmful influence on plants; the elimination of the use of sulphuric acid with resulting calcium sulphate in the fertilizer; the elimination of all calcium compounds in the fertilizer product; the obtaining of vastly increased ratios of nitrogen and phosphorous in the fertilizer; and, in view of the highly useful by-products obtainable with the aid of the present invention, reduction in cost of manufacture. The invention moreover, enables the use of low concentration phosphate rocks.

Other and further modifications will obviously occur to those skilled in the art, and all such are considered to fall within the spirit and scope of the invention as defined in the appended claims.

What is claimed is:

1. The process of producing a phosphate fertilizer having active fertilizer constituents of the order of fifty percent and higher and substantially devoid of calcium, comprising reacting phosphate rock with hydrochloric acid to produce a product containing a substantial amount of calcium monophosphate and calcium chloride, reacting a combination of ammonia and carbon dioxide with said product while controlling the proportions of said ammonia and said carbon dioxide to maintain the pH of the reacting mass between substantially 5 and 7, thereby producing a solution containing the principal portion of said phosphate as phosphate ions maintained in the water soluble state and containing ammonium chloride and precipitating the calcium as a carbonate, filtering out said calcium carbonate precipitate, adding further ammonia to the filtrate, and controlling the proportion of said further ammonia to raise the pH of the filtrate above 7 and precipitate out an ammonium phosphate salt while maintaining said ammonium chloride in solution.

2. The process of claim 1, wherein said proportion of said further ammonia is controlled to raise the pH to substantially 9.

3. The process of claim 1, wherein the ammonium phosphate salt is one of the group consisting of $(NH_4)_2HPO_4$ and $(NH_4)_{2\ 1/2}H_{1/2}PO_4$.

References Cited in the file of this patent

UNITED STATES PATENTS

| | | |
|---|---|---|
| 1,854,291 | Burdick | Apr. 29, 1932 |
| 2,134,013 | Turrentine | Oct. 25, 1938 |
| 2,211,918 | Turrentine | Aug. 20, 1940 |
| 2,555,656 | Plusje et al. | June 5, 1951 |